(12) United States Patent
McGee et al.

(10) Patent No.: US 8,112,208 B2
(45) Date of Patent: Feb. 7, 2012

(54) ENGINE SPEED REDUCTION PREPARATORY TO AN ENGINE RESTART

(75) Inventors: Ryan A. McGee, Ann Arbor, MI (US); Ihab S. Soliman, Canton, MI (US); Urs Christen, Aachen (DE); Rainer Busch, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 415 days.

(21) Appl. No.: 12/473,422

(22) Filed: May 28, 2009

(65) Prior Publication Data
US 2010/0305820 A1 Dec. 2, 2010

(51) Int. Cl.
*G06F 19/00* (2006.01)

(52) U.S. Cl. ............................. 701/54; 477/102; 477/90

(58) Field of Classification Search .................... 701/54, 701/112; 123/179.4, 179.3, 179.5, 339.1; 477/102, 90, 110, 121
See application file for complete search history.

(56) References Cited

U.S. PATENT DOCUMENTS

| | | | |
|---|---|---|---|
| 5,950,594 A | 9/1999 | Mizuno | |
| 6,208,034 B1 | 3/2001 | Yamaguchi | |
| 6,275,759 B1 * | 8/2001 | Nakajima et al. | 701/54 |
| 6,564,765 B2 * | 5/2003 | Kuroda et al. | 123/179.4 |
| 6,702,718 B2 | 3/2004 | Tani et al. | |
| 6,807,934 B2 | 10/2004 | Kataoka et al. | |
| 7,524,266 B2 * | 4/2009 | Nobumoto et al. | 477/110 |
| 7,610,974 B2 * | 11/2009 | Abe | 180/65.21 |
| 2004/0038774 A1 * | 2/2004 | Kuroda et al. | 477/3 |
| 2005/0109302 A1 * | 5/2005 | Tetsuno et al. | 123/179.5 |
| 2008/0066449 A1 * | 3/2008 | Murata et al. | 60/285 |
| 2008/0162007 A1 * | 7/2008 | Ishii et al. | 701/54 |
| 2008/0227589 A1 * | 9/2008 | Zillmer et al. | 477/3 |
| 2009/0019852 A1 * | 1/2009 | Inoue et al. | 60/608 |
| 2009/0024287 A1 | 1/2009 | Laubender | |
| 2009/0032317 A1 | 2/2009 | Epshteyn | |
| 2009/0050107 A1 * | 2/2009 | Fuwa et al. | 123/339.1 |
| 2009/0145253 A1 * | 6/2009 | Katakura et al. | 74/335 |

FOREIGN PATENT DOCUMENTS

WO    WO2006126698 A1    11/2006

\* cited by examiner

*Primary Examiner* — Thomas Black
*Assistant Examiner* — Marthe Marc-Coleman
(74) *Attorney, Agent, or Firm* — David B. Kelley, Esq.; MacMillian, Sobanski & Todd, LLC

(57) ABSTRACT

A method for restarting an engine of a vehicle includes stopping the vehicle and holding the vehicle stationary, reducing engine speed, increasing a rate of reduction of engine speed, if engine speed is less than a reference speed when a desired restart of the engine is indicated, and initiating an engine restart when engine speed is substantially zero.

23 Claims, 5 Drawing Sheets

ENGINE SPEED REDUCTION PREPARATORY TO AN ENGINE RESTART

BACKGROUND OF THE INVENTION

1. Field of the Invention

This invention relates generally to a powertrain for a motor vehicle vehicle, such as a hybrid electric vehicle (HEV), and, more particularly, to control of an engine shutdown and restart.

2. Description of the Prior Art

A HEV combines a conventional propulsion system having an internal combustion engine and a transmission with a rechargeable energy storage system that includes an electric motor and electric storage battery to improve fuel economy over a conventional vehicle.

Motor vehicles can be designed to employ certain aspects of hybrid electric technology to reduce fuel consumption, but without use of a hybrid powertrain. In such vehicles, called "micro-HEVs", shutting down the engine during conditions where the engine operates at idle speed is used to reduce fuel consumption and reduce emissions in a conventional powertrain, which includes an internal combustion engine and a transmission, but no electric machine for driving the wheels. The primary condition that is checked by the micro-HEV powertrain control system before stopping the engine is that the driver has applied the brakes and the vehicle is stopped since the engine would typically be idling during these conditions in a conventional vehicle. Once the driver releases the brake pedal indicating a request for vehicle propulsion, the powertrain control system will automatically restart the engine.

Because the engine of a micro-HEV powertrain produces all the propulsion torque, it is important that the engine start-stop function be seamless and transparent to the driver. When the driver requests torque at the wheels by depressing the accelerator pedal or releasing the brake pedal, any delay in starting the engine must be minimized, yet the starter motor cannot be engaged until engine speed is at, or very near zero.

The determination of when to stop the engine is based on a variety of data such as vehicle speed, brake pedal position and clutch pedal position (in the case of a manual transmission). Once it is determined that an engine stop is necessary, the control system transitions the engine from an idle state to a ramp down state. During the ramp down state, the engine subsystem controls its actuators (spark, fuel, air, etc.) to smoothly ramp down the engine speed to zero. Furthermore, there is an engine speed above which the engine can support a change of mind (COM) engine restart. If the driver requests an engine restart during the ramp down state and the engine speed is above this "change of mind" engine speed then the engine is ramped back up to the idle speed by using the engine subsystem actuators (spark, fuel, air, etc). If the engine speed is below the "change of mind" engine speed, then the engine must be ramped down to zero (or very close to zero) and the starter motor must be used to restart the engine. This change of mind scenario can result in a long delay in restarting the engine.

The problem is, therefore, the potentially long delay in change-of-mind engine restart because the engine subsystem cannot restart without support from the starter motor. A need exists to minimize the delay in restarting the engine when a change of mind occurs with engine speed less than the "change of mind" engine speed.

SUMMARY OF THE INVENTION

A method for restarting an engine of a vehicle includes stopping the vehicle and holding the vehicle stationary, increasing a rate of reduction of engine speed, if engine speed is less than a reference speed when a desired restart of the engine is indicated, and initiating an engine restart when engine speed is substantially zero. The method includes initiating an engine restart, if engine speed is greater than the reference speed when a desired restart of the engine is indicated.

The method of the engine start-stop function is seamless and transparent to the driver. When the driver requests torque at the wheels by depressing the accelerator pedal or releasing the brake pedal, delay in starting the engine is minimized, yet the starter motor is of the type that cannot be engaged with the engine until engine speed is at, or very near zero.

The method eliminates potentially long delay in completing a change-of-mind engine restart, although it relies on a starter motor that disengages from the engine except when engine speed is substantially zero.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
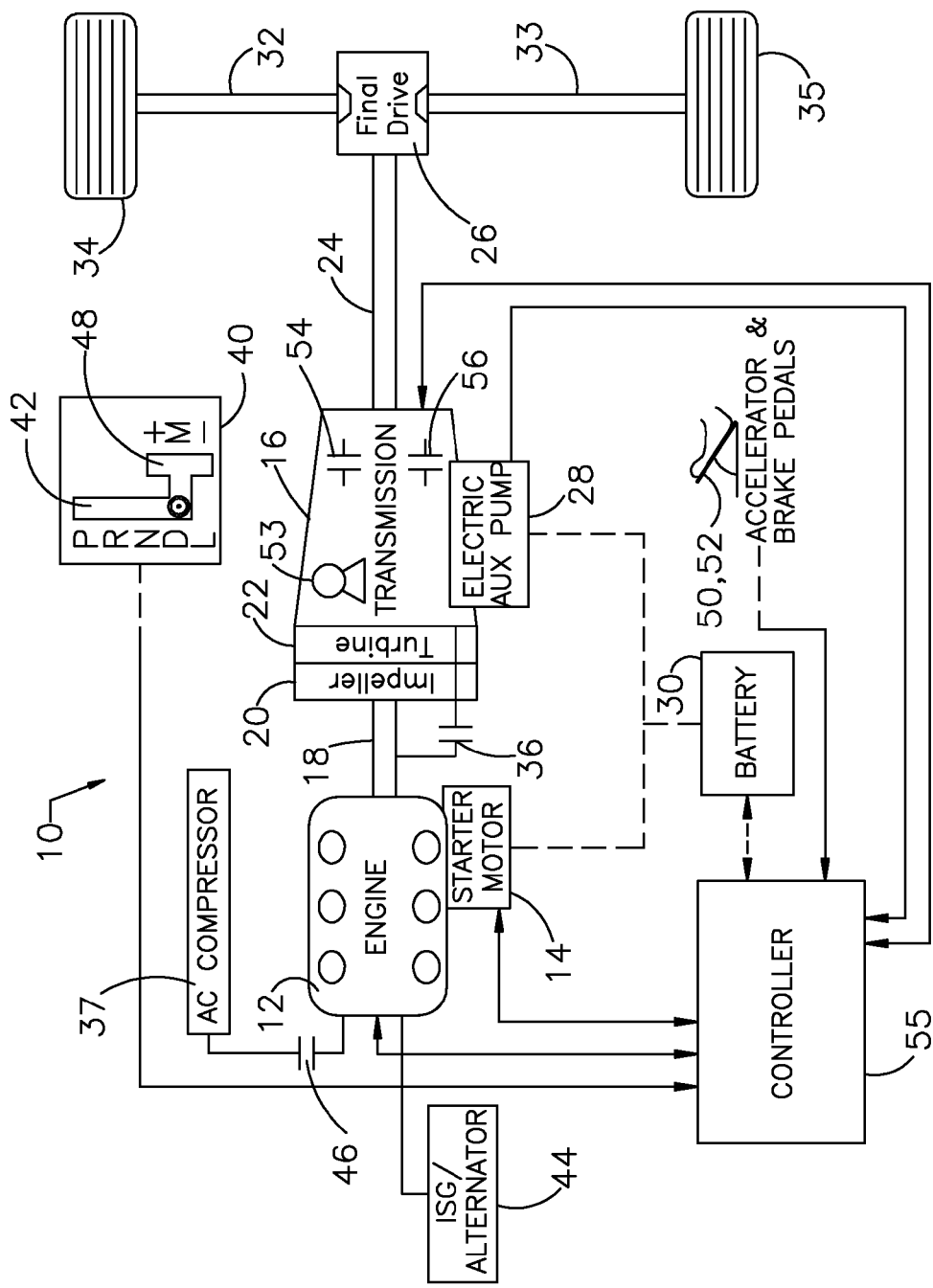
FIG. 1 is a schematic diagram of a micro-HEV powertrain.

Referring now to the drawings, the micro-HEV powertrain 10 of FIG. 1 includes a power source 12, such as an internal combustion engine; an enhanced engine starter motor 14; automatic transmission 16; engine crankshaft 18; impeller 20 driveably connected by shaft 18 to the engine; turbine 22, hydrokinetically driven by the impeller 20; a transmission output 24; final drive mechanism 26, connected to the output; an electric auxiliary hydraulic pump (EAUX) 28, whose output pressurizes the hydraulic system of the transmission 16; an electric storage battery 30, which supplies electric power to the pump 28, starter 14, and a microprocessor-based controller 55; and axle shafts 32, 33, driveably connect to the driven wheels 34, 35 through the output and final drive mechanism.

A torque converter bypass clutch 36 mechanically connects the engine crankshaft 18 to the turbine's shaft, i.e. the transmission input, when clutch 36 is engaged.

An air conditioning compressor 37 is driveably connected by a clutch 46 and an accessory drive belt to the crankshaft of engine 12. Preferably, the engine starter motor 14 is engageable with engine 12 when the engine speed is substantially zero. An integrated starter generator (ISG) or an alternator 44 arranged separate from the starter motor 14 for generating electric power to charge the battery is driveably connected to the crankshaft of engine 12.

A gear shifter 40 is moved manually by the vehicle operator among P, R, N, D and L positions in an automatic mode channel 42 and between upshift (+) and downshift (−) positions in a manual mode channel 48.

Accelerator and brake pedals 50, 52, controlled manually by the vehicle operator, provide input demands to a control system for changes in engine wheel torque and changes in brake force, respectively.

Located within transmission 16 are friction control elements, i.e., clutches and brakes, whose state of coordinated engagement and disengagement produce the forward gears and reverse gear. The first forward gear, low gear, is produced when at least one, but preferably two of the control elements 54, 56 are engaged concurrently. The transmission control elements, whose engagement produces the desired gear in which the vehicle will be launched, are referred to as launch elements 54, 56. Hydraulic line pressure produced by the electric auxiliary pump 28 while the engine 12 is shutdown is used to fill and stroke the launch elements 54, 56, thereby preparing the transmission 16 for responsive torque transmission once the engine restart is completed. Stroking the launch control elements 54, 56 takes up clearances between the servo pistons and a pack of friction plates in the control elements, and clearances among the friction plates. The launch elements 54, 56 have substantially no torque transmitting capacity when stroke pressure is present in the servo cylinders that actuate the launch elements.

Transmission 16 also contains a hydraulic pump 53, such as a gerotor pump, whose output is used to produce pressure in the transmission's hydraulic circuit, through which the control elements 54, 56 are pressurized to a state of full engagement in coordination with the engine restart method.

A microprocessor-based controller 55, accessible to a restart control algorithm, communicates through electric signals transmitted on a communication bus with the engine 12, starter 14, transmission 16, gear shift lever 40, battery 30, auxiliary pump 28, and the accelerator and brake pedals 50, 52.

Figure 5:
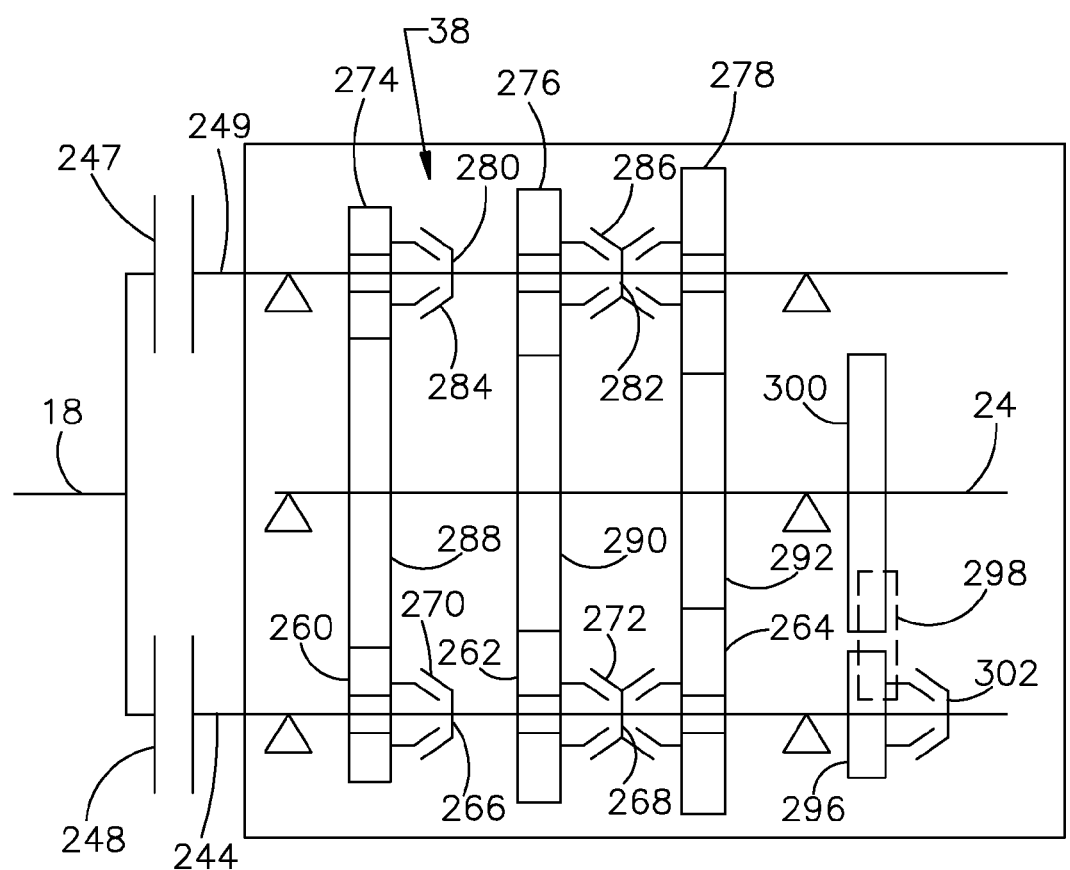
FIG. 5 is a schematic diagram showing details of a dual input clutch powershift transmission.

A dual input clutch powershift transmission 38, of the type shown in FIG. 5, can be substituted for transmission 16 in the micro-HEV powertrain 10 of FIG. 1.

The engine 12 is stopped in response to depressing brake pedal 52. After an engine stop is initiated, a change of mind is indicated by releasing the brake pedal 52, or by moving the gear shift lever 40 from the D position to any of the other positions in the automatic mode channel 42 or into the manual mode channel 48, or by depressing the accelerator pedal 50.

Figure 2:
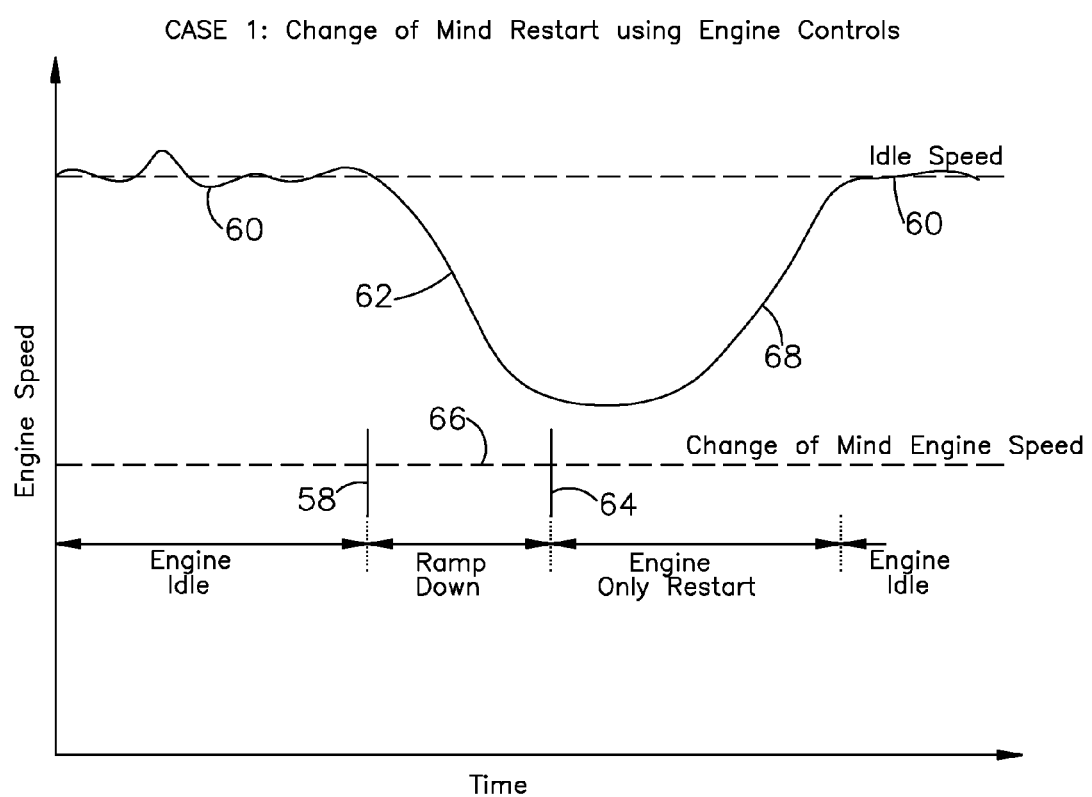
FIG. 2 is graph showing the variation of engine speed during a change-of-mind engine restart event.

Referring to FIG. 2, when it is determined that an engine stop will be executed automatically, the control system, through its control of engine subsystem actuators, such as spark timing, fuel, air, etc., initiates at 58 an engine speed reduction from idle speed 60 along ramp 62 toward zero engine speed. But if conditions change during the engine speed reduction, e.g. as a result of the driver releasing the brake pedal 52 or changing the position of the gear shifter 40, the control system initiates an engine restart at 64. If engine speed is then above a change-of-mind reference engine speed 66, engine speed increases along ramp 68 to idle speed 60 through control of the engine subsystem actuators.

Figure 3:
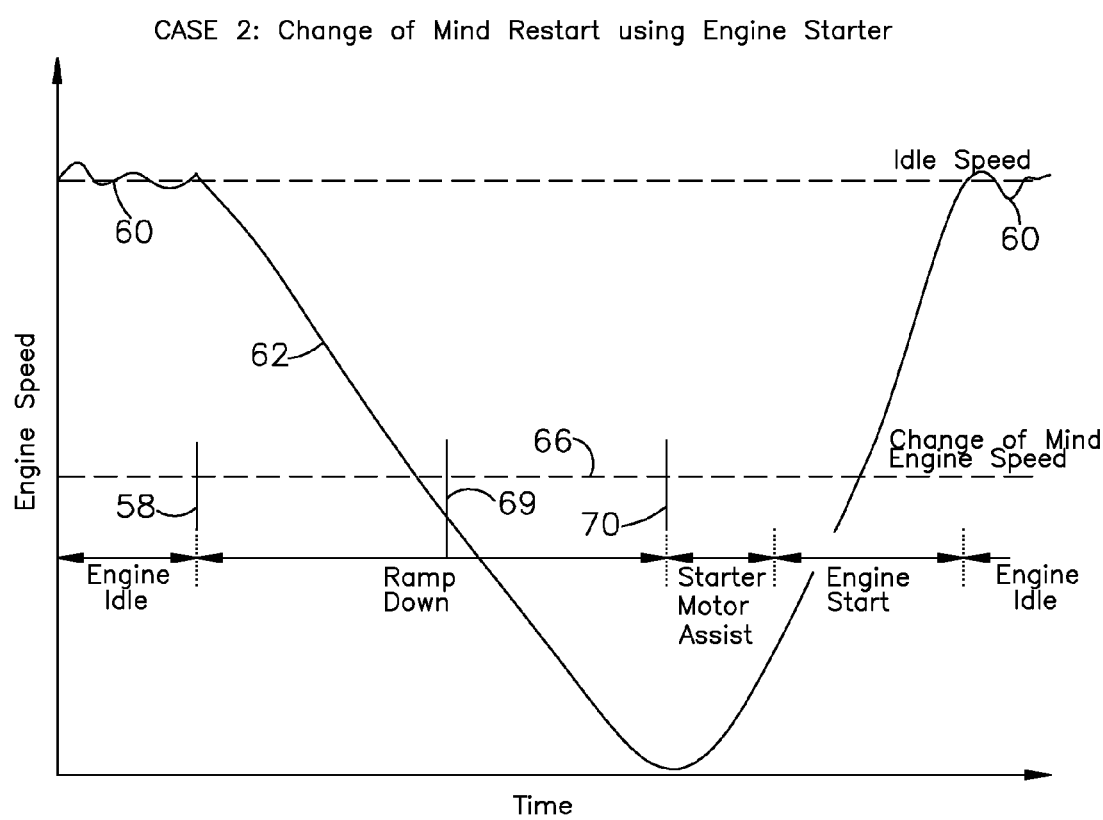
FIG. 3 is graph showing the variation of engine speed during a change-of-mind engine restart event in which the starter is used.

Referring to FIG. 3, if engine speed is less than the change-of-mind reference speed 66 when a desired engine restart is indicated at 69, i.e., the change of mind event, engine speed must continue to decrease along ramp 62 to, or close to zero. The starter motor 14 is then used at 70 to initiate a restart of the engine 12.

Figure 4:
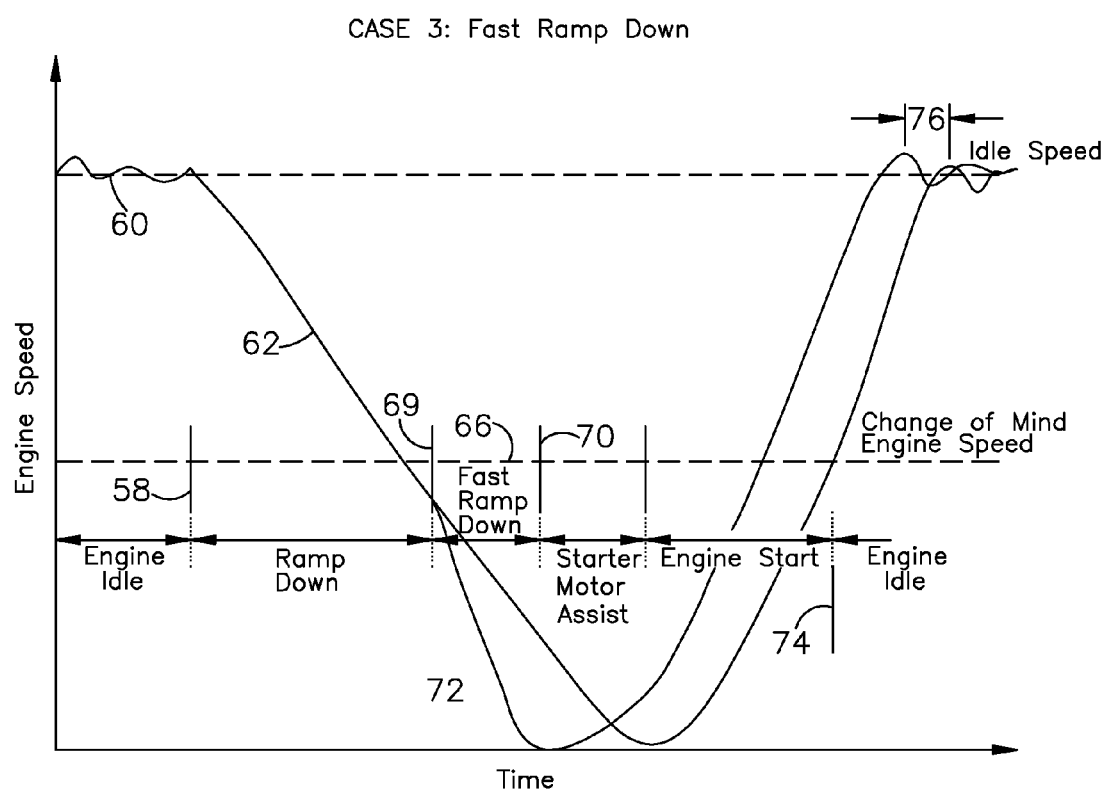
FIG. 4 is graph showing the variation of engine speed during a change-of-mind engine restart event, in which engine speed is rapidly reduced.

FIG. 4 illustrates the variation of engine speed during an engine restart event, during which a reduction in engine speed is expedited. Engine speed is rapidly brought to zero speed using the transmission 16, 38 or auxiliary components including AC compressor 37, ISG or alternator 44, or combinations of these components. If a change of mind restart is indicated at 69 with engine speed less than the change of mind reference engine speed 66, the control system increases the rate of decrease of engine speed along a ramp 72, whose negative slope is greater than the slope of the original ramp 62, thereby causing engine speed to reach zero speed sooner. The starter motor 14 is used at 70 to initiate a restart of the engine 12, which is completed at 74, thereby shortening the time 76 to restart the engine.

The increase in negative slope of ramp 72 can be produced by increasing engine pumping losses beginning at the indication of a change of mind 69 and continuing until engine speed is substantially zero at the bottom of ramp 72. Increased engine pumping losses are achieved by modifying the air path of the engine through a combination of engine throttle, valve timing, and exhaust gas recirculation (EGR) settings. In order to increase pumping losses, EGR has to be cut (close the EGR valve) and the throttle is closed. Valve timing could be changed to maximize the air spring forces (open intake valve late, close it with normal timing; open exhaust valve late, close it with normal timing). For diesel engines, this is typically not done in order to avoid excessive air spring forces during shutdown.

The increase in negative slope of ramp 72 can be produced also by increasing the load on the engine such as by using the transmission 16, 38 to driveably connect the engine crankshaft 18 to the driven wheels 34, 35 while not allowing the vehicle to move.

Transmission 16 is a conventional multiple-speed, step-change automatic transmission having planetary gearing controlled by clutches and brakes 54, 56. When powertrain 10 includes transmission 16, the vehicle is stationary and engine 12 is stopping, the increase in negative slope of ramp 72 is produced by engaging the transmission control elements 54, 56, thereby connecting driveshaft 24 to the engine crankshaft 18. In this way, the rotational kinetic energy of engine 12 is dissipated as heat into the control elements 54, 56.

A preferred way to accomplish this is to fully lock the torque converter bypass clutch, and tie-up the transmission gearing such that the transmission output 24 and vehicle wheels 34, 35 cannot rotate. Once the geartrain is tied-up using the transmission control elements, slip across the transmission can be controlled to zero speed by regulating slip across the torque converter by increasing the torque capacity and engaging the bypass clutch 36. Tying up the transmission geartrain essentially locks the vehicle wheels 34, 35. Locking the torque converter pulls the engine speed down to zero. The transmission auxiliary pump 28 provides hydraulic pressure, thereby maintaining line pressure in the transmission circuit, since the engine is stopping.

When powertrain 10 includes a powershift transmission 38, the vehicle is stationary and the engine is stopping, the increase in negative slope of ramp 72 is produced by engaging the transmission to connect the driveshaft 24 to the engine crankshaft 18. In this way, the rotational kinetic energy of engine 12 is dissipated as heat into at least one of the input clutches 247, 248. With either layshaft 244, 249 fully in gear, the corresponding input clutch 248, 247 can be engaged to decelerate the engine speed to zero. This can be done in a controlled manner by regulating the torque capacity of the input clutch during the engagement as the engine speed is reduced to zero. By increasing the torque capacity of the input clutches 247, 248, the load on the engine is increased thereby decelerating the engine speed.

Alternatively, the increase in negative slope of ramp 72 can be produced by increasing engine load such as by driveably connecting to the engine 12 either the AC compressor 37, alternator or integrated starter generator 44, or a combination of these. The exact combination of auxiliary devices will vary depending upon the powertrain components.

FIG. 5 illustrates details of a dual input clutch, powershift transmission 38 that includes a first input clutch 248, which selectively connects the input 18 of the transmission alternately to the even-numbered forward gears and reverse gear associated with a first layshaft 244, and a second input clutch 247, which selectively connects the input 18 alternately to the odd-numbered gears associated with a second layshaft 249.

Layshaft 244 supports pinions 260, 262, 264, which are each journalled on shaft 244, and couplers 266, 268, which are secured to shaft 244. Pinions 260, 262, 264 are associated respectively with the second, fourth and sixth gears. Coupler 266 includes a sleeve 270, which can be moved leftward to engage pinion 260 and driveably connect pinion 260 to shaft 244. Coupler 268 includes a sleeve 272, which can be moved leftward to engage pinion 262 and driveably connect pinion 262 to shaft 244 and can be moved rightward to engage pinion 264 and driveably connect pinion 264 to shaft 244.

Layshaft 249 supports pinions 274, 276, 278, which are each journalled on shaft 249, and couplers 280, 282, which are secured to shaft 249. Pinions 274, 276, 278 are associated respectively with the first, third and fifth gears. Coupler 280 includes a sleeve 284, which can be moved leftward to engage pinion 274 and driveably connect pinion 274 to shaft 249. Coupler 282 includes a sleeve 286, which can be moved leftward to engage pinion 276 and driveably connect pinion 276 to shaft 249 and can be moved rightward to engage pinion 278 and driveably connect pinion 278 to shaft 249.

Transmission output 24 supports gears 288, 290, 292, which are each secured to output shaft 24. Gear 288 meshes with pinions 260 and 274. Gear 290 meshes with pinions 262 and 276. Gear 292 meshes with pinions 264 and 278.

A reverse pinion 296, journalled on layshaft 244, meshes with an idler 298, which meshes with a reverse gear 300 secured to output shaft 24. A coupler 302 selectively connects reverse pinion 296 to layshaft 224.

Couplers 266, 268, 280, 282 and 302 may be synchronizers, or dog clutches or a combination of these.

Transmission 38 can be locked-up by concurrently connecting layshafts 249 and 244 to the transmission output 24. Layshaft 249 can be is driveably connected to transmission output 24 by either engaging coupler 280 with pinion 274, or engaging coupler 282 with either pinion 276 or 278. Similarly, layshaft 244 can be driveably connected to transmission output 24 by either engaging coupler 266 with pinion 260, or engaging coupler 268 with either pinion 262 or 264. With the layshafts 244, 249 so connected to output 24, the engine crankshaft 18 can be grounded by at least partially engaging input clutches 247, 248 concurrently.

In accordance with the provisions of the patent statutes, the preferred embodiment has been described. However, it should be noted that the alternate embodiments can be practiced otherwise than as specifically illustrated and described.

The invention claimed is:

1. A method for restarting a vehicle engine, comprising:
 (a) automatically stopping the engine;
 (b) after a desired engine restart is indication by one of release of an accelerator pedal and movement of a gear shifter, increasing a rate at which engine speed decreases due to said stopping to a second rate while engine speed is less than a change of mind speed that is between engine idle speed and zero;
 (c) automatically restarting the engine.

2. The method of claim 1 further comprising:
 initiating an engine restart, if engine speed is greater than the reference speed when a desired restart of the engine is indicated.

3. The method of claim 1 wherein step (b) further comprises using a transmission to increase load on the engine.

4. The method of claim 1 wherein step (b) further comprises:
 engaging a gear of a transmission to driveably connect the engine to a wheel of the vehicle.

5. The method of claim 4 wherein engaging a gear of a transmission occurs while engine speed is being reduced.

6. The method of claim 1 wherein step (b) further comprises the steps of:
 engaging more control elements of a transmission than the control elements corresponding to any gear in which the transmission can operate such that an output of the transmission cannot rotate; and
 engaging a bypass clutch and locking a torque converter located in a drive path that connects the engine and a transmission input.

7. The method of claim 6 wherein the steps of claim 6 are executed while engine speed is decreasing.

8. The method of claim 1 wherein step (b) further comprises the steps of:
 driveably connecting layshafts of a powershift transmission to a transmission output; and
 at least partially engaging input clutches of the transmission such that the transmission output is driveably connected to the engine.

9. The method of claim 1 wherein step (b) further comprises using at least one of a compressor, a hydraulic pump, and an integrated starter generator to increase load on the engine.

10. The method of claim 1 wherein step (c) further comprises increasing engine pumping losses using at least one of modifying the air path of the engine using at least one of an engine throttle, valve timing, and exhaust gas recirculation settings.

11. A method for restarting an engine of a vehicle, comprising the steps of:
 (a) automatically stopping the engine;
 (b) reducing engine speed at a first rate;
 (c) after a desired engine restart is indication by one of release of an accelerator pedal and movement of a gear shifter, reducing engine speed at a second rate greater than the first rate while engine speed is less than a change of mind speed that is between engine idle speed and zero;
 (d) automatically restarting the engine when engine speed is substantially zero.

12. The method of claim 11 wherein step (c) further comprises using a transmission to increase load on the engine.

13. The method of claim 11 wherein step (c) further comprises:

engaging a gear of a transmission to driveably connect the engine to a wheel of the vehicle.

14. The method of claim 13 wherein engaging a gear of the transmission occurs while engine speed is being reduced.

15. The method of claim 11 wherein step (c) further comprises the steps of:

engaging more control elements of a transmission than the control elements corresponding to any gear in which the transmission can operate such that an output of the transmission cannot rotate; and engaging a bypass clutch and locking a torque converter located in a drive path that connects the engine and a transmission input.

16. The method of claim 15 wherein the steps of claim 15 are executed while engine speed is being reduced.

17. The method of claim 11 wherein step (c) further comprises the steps of:

driveably connecting layshafts of a powershift transmission to a transmission output; and at least partially engaging input clutches of the transmission such that the transmission output is driveably connected to the engine.

18. The method of claim 11 wherein step (c) further comprises using at least one of a compressor, starter motor, alternator and integrated starter generator to increase load on the engine.

19. The method of claim 11 wherein step (d) further comprises increasing engine pumping losses using at least one of modifying the air path of the engine using at least one of an engine throttle, valve timing, and exhaust gas recirculation settings.

20. A system for restarting an engine of a vehicle, comprising:

an engine;
a starter motor;
a brake pedal;
an accelerator pedal;
a gear shifter;
a controller configured to automatically stop the engine in response to a depression of the brake pedal; after a desired engine restart is indication by one of release of the accelerator pedal and movement of a gear shifter, to produce a second a rate at which engine speed decreases due to the engine stopping while engine speed is less than a change of mind speed that is between engine idle speed and zero, and to automatically restart the engine using the starter motor.

21. The system of claim 20, further comprising:
a transmission driveably connectable to the engine and wheels of the vehicle; and
wherein the controller is further configured to control the transmission to produce a drive connection between the engine and the vehicle wheels.

22. The system of claim 20, further comprising:
at least one of a compressor, alternator and integrated starter generator; and
wherein the controller is further configured to use at least one of the compressor, the alternator and the integrated starter generator to increase load on the engine and stop the engine.

23. The system of claim 20, wherein:
operation of the engine is controlled by at least one of a throttle, flow of fuel and air into the engine, and exhaust gas recirculation settings; and
the controller is further configured to control engine speed using at least one of the throttle, flow of fuel and air into the engine, intake and exhaust valve timing and the exhaust gas recirculation settings.

* * * * *